(12) United States Patent
Budda

(10) Patent No.: US 9,884,379 B1
(45) Date of Patent: Feb. 6, 2018

(54) CERAMIC FACE MILL WITH CIRCULAR ARC PROFILE FOR MACHINING INCONEL

(71) Applicant: Iscar, Ltd., Tefen (IL)

(72) Inventor: Eliyahu Budda, Neve Ziv (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 15/451,873

(22) Filed: Mar. 7, 2017

(51) Int. Cl.
*B23C 5/10* (2006.01)
*B23C 5/20* (2006.01)

(52) U.S. Cl.
CPC ........ *B23C 5/207* (2013.01); *B23C 2200/203* (2013.01); *B23C 2226/18* (2013.01)

(58) Field of Classification Search
CPC ........... B23C 5/207; B23C 5/10; B23C 5/109; B23C 5/16; B23C 2210/03; B23C 2210/248; B23C 2210/32; B23C 2210/321; B23C 2210/325; B23C 2220/36; B23C 2226/18; B23B 2226/18
See application file for complete search history.

(56) References Cited

U.S. PATENT DOCUMENTS

| | | | |
|---|---|---|---|
| 8,647,025 B2 * | 2/2014 | Davis | B23C 5/10 407/119 |
| 8,858,128 B2 | 10/2014 | Budda et al. | |
| 9,211,593 B2 | 12/2015 | Budda et al. | |
| 9,227,253 B1 * | 1/2016 | Swift | B23C 5/28 |
| 9,517,515 B2 | 12/2016 | Shpigelman | |
| 9,555,486 B2 * | 1/2017 | Baba | B23C 5/10 |
| 2005/0133277 A1 * | 6/2005 | Dixon | B23C 5/1009 175/426 |
| 2007/0160429 A1 * | 7/2007 | Volokh | B23C 5/003 407/53 |
| 2009/0185878 A1 * | 7/2009 | Turrini | B23C 5/10 409/132 |
| 2017/0144234 A1 * | 5/2017 | Shpigelman | B23C 5/10 |

* cited by examiner

*Primary Examiner* — Will Fridie, Jr.
(74) *Attorney, Agent, or Firm* — Womble Bond Dickinson (US) LLP

(57) ABSTRACT

A face mill includes a circular arc profile and is configured for machining Inconel. In particular the cutting portion is made of a ceramic material, and has an axial sub-edge with a positive axial rake angle α to increase tool life.

20 Claims, 2 Drawing Sheets

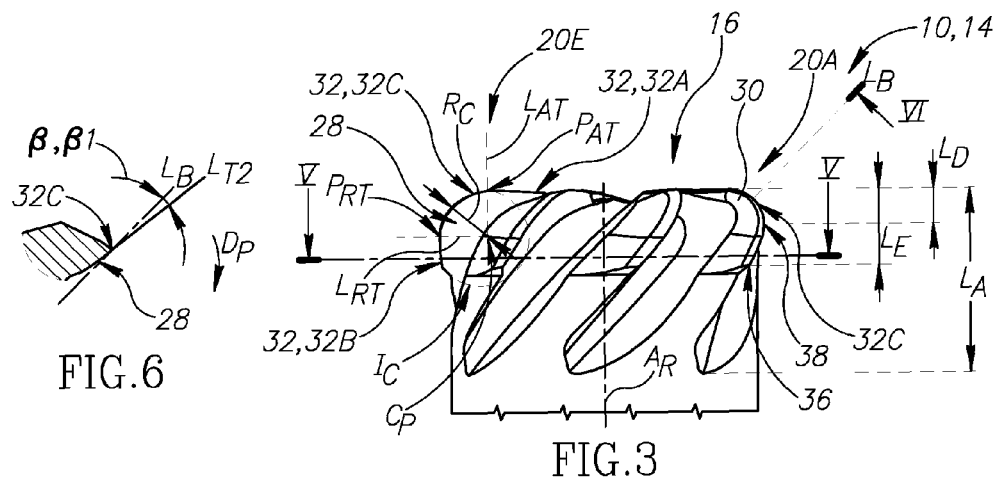
FIG.6
FIG.3
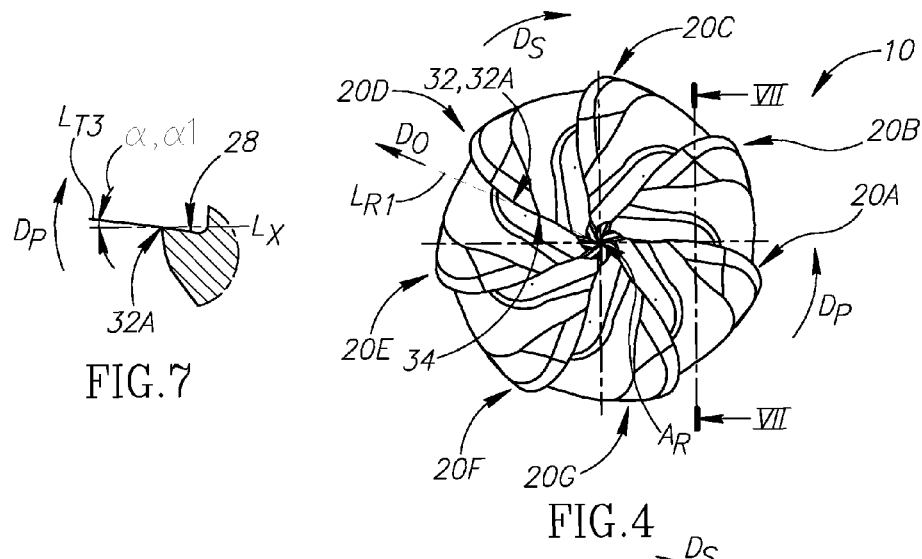
FIG.7
FIG.4
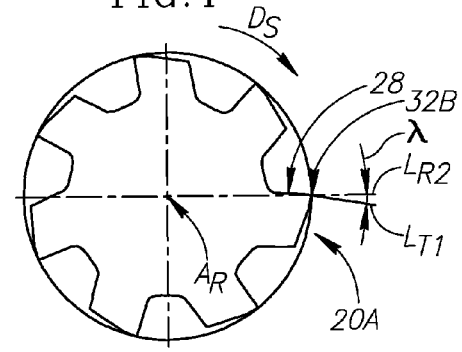
FIG.5

CERAMIC FACE MILL WITH CIRCULAR ARC PROFILE FOR MACHINING INCONEL

FIELD OF THE INVENTION

The subject matter of the present application relates to a ceramic face mill with a circular arc profile and configured for machining exotic materials, in particular Inconel.

BACKGROUND OF THE INVENTION

Nowadays, end mills are most commonly made of cemented carbide due to a combination of factors, in particular the balance of roughness and toughness qualities thereof in combination with a relatively cost effective price.

The present application relates to a ceramic face mill. Ceramic has for decades been known as one of the materials which can be used for machining, but, apart from relatively small cutting inserts, is rarely used due to being comparatively more brittle and substantially more expensive than other materials such as cemented carbide.

Certain exotic materials, such as Inconel, are difficult to machine due to extreme heat generated during machining which quickly degrade a cutting tool. Consequently, these materials are normally machined at a low cutting speed (e.g. about 25 m/min). For such materials, the disadvantages of ceramic, mentioned above, are partially offset by a ceramic material's comparatively higher temperature tolerance than ceramic carbide. Such temperature quality is discussed in more detail in U.S. Pat. No. 8,647,025 entitled "monolithic ceramic end mill".

However, regardless of the beneficial temperature quality, the ceramic end mill disclosed in U.S. Pat. No. 8,647,025 discloses significant wear. To elaborate, even though it is stated there that "The end mill was examined and found to have little chipping . . . " (col. 5, lines 47 and 48), the present applicant notes that a skilled person would understand the amount of wear described in the examples (ranging from 0.16 mm to 0.40 mm) is not what would be considered "little chipping". To the contrary, the values given are considerably greater than the wear normally tolerated for a similar diameter tool (in this example the diameter being 8 mm) made of cemented carbide. For example, for an 8 mm diameter endmill of cemented carbide the present applicant's internal standard for acceptable wear is 0.08 mm, which is half of the lowest wear example (0.16 mm) given. Nonetheless, the comparatively high wear is not surprising due to the known comparatively brittle nature of ceramic.

The present application is further concerned with an end mill dedicated to facing machining applications, i.e. a face mill, which primarily machines with the cutting edge at a cutting end face as opposed to along the periphery thereof.

More particularly, the present application is directed to a face mill having a circular arc profile. Even if not stated explicitly, it will be understood that all face mills subject the present application have a circular arc profile. Similarly, even if the word "ceramic" is not used, it will be understood that at least the cutting portion of the face mill, even if not explicitly stated is made of a ceramic material (or stated in other words a "ceramic cutting portion" or a "ceramic face mill"). It will be understood that these statements refer at least to a ceramic substrate, and that the cutting portion or entire face mill could have a non-ceramic coating.

A circular arc profile is presented during rotation thereof about a rotation axis and viewed in a direction perpendicular to the rotation axis. For the purposes of the specification and claims, this will be called a "profile view". The circular arc profile defines a portion of an imaginary circle. The circle has a circle center point, axial and radial tangent lines, axial and radial tangent points, and a radius magnitude measurable from the circle center point to the circular arc profile. The axial tangent point is located at an intersection of the circle and the axial tangent line which extends forwardly from the circle center point and in a direction parallel with a rotation axis of the face mill. The radial tangent point is located at an intersection of the circle and the radial tangent line which extends radially outward from the circle center point and in a direction perpendicular with the rotation axis. For ease of understanding, a cutting edge of a tooth of a face mill can be theoretically divided into three sub-edges, namely an axial sub-edge located at a cutting end face of a face mill, a radial sub-edge located along a periphery of a cutting portion of an face mill, and a corner sub-edge extending from the axial sub-edge to the radial sub-edge. More precisely, a corner sub-edge can be defined as extending from a radial tangent point to an axial tangent point, a radial sub-edge can be defined as extending from a radial tangent point in a direction away from the corner sub-edge, and an axial sub-edge can be defined as extending from the axial tangent point in direction away from the corner sub-edge. A circular arc profile is exemplified in U.S. Pat. No. 9,517,515, the disclosure of which is incorporated herein by reference.

It will be understood that the circle and associated lines, planes, tangent points and radius magnitude, are imaginary and hence are not visible features on a face mill but rather are derivable through the construction thereof.

The present application also relates to face mills with blended gashes, blended gashes being exemplified in, for example, U.S. Pat. No. 8,858,128 of the present applicant and the citations thereof, i.e. National Aerospace Standard 986 (1973; sheet no. 55), and U.S. Pat. No. 8,414,228.

In view of the disadvantageous nature of an end mill with a ceramic cutting portion, at least when compared with cemented carbide, it is clear a unique design is needed to make such design economically feasible.

SUMMARY OF THE INVENTION

A first design consideration of the present application is to provide a feasible end mill having a ceramic cutting portion. Accordingly the end mill type chosen is a face mill which is uniquely suited to ceramic for at least two reasons. The first reason being that a comparatively brittle ceramic end mill is more likely to fracture if used significantly along a peripheral surface thereof. This is due not only to expected bending forces, but comparatively high vibrations expected at the cutting speed which ceramic has been found capable of operating at. During testing it was found that the cutting speed had no significant effect on the tool life and therefore cutting speeds above 300 m/min are possible, in essence dependent on the maximum speed of the workstation (for example testing was carried out at the maximum speed of the workstation available, which was 600 m/min, which produced a comparative tool life to a test of 300 m/min). A second reason being the high cost of grinding long flutes along the side of the end mill. Accordingly, each aspect of the present application is directed to a face mill. Further independently advantageous features are detailed in the aspects.

In accordance with a first aspect of the subject matter of the present application, there is provided a ceramic face mill configured comprising a shank portion and a cutting portion; at least the cutting portion being made of a ceramic material and comprising at least one tooth comprising an axial sub-edge having a positive axial rake angle α.

It will be understood that a cutting edge with a positive rake angle provides a sharper edge for machining a work piece than a cutting edge with a negative rake angle. While a positive rake angle can be considered to cut through a work piece more smoothly, it is more susceptible to wear and breakage than the comparatively duller negative rake angle cutting edge. It is for this very reason that cutting edges with negative rake angles are used, i.e. where edge reinforcement is desired. Such negative rake angles are also the expected choice for brittle tool materials such as ceramic, since rapid wear is expected.

It will also be understood that throughout the entire application and claims, when it is stated that axial sub-edge has a positive axial rake angle α, this means that the entire axial-sub-edge has a positive axial rake angle (although the angle itself may vary in a range above zero). It will be understood that the present application refers to a face mill where the machining is carried out primarily with the axial sub-edge. However when it is stated that one of the secondary sub-edges, i.e. the corner sub-edge or even more secondary radial sub-edge, have a certain rake angle, it is not implied that the entire corner or radial sub-edge has a rake angle which is positive or negative, but rather the explicit position of the rake angle should be noted.

Since rapid wear was expected when using a face mill with a ceramic cutting portion, it was theorized and indeed found in practice that by incorporating an axial sub-edge (the primary edge used for face applications) having a positive axial rake angle α, that the edge would rapidly deteriorate. For a comparative cemented carbide face mill such deterioration (stated differently "wear") would result in a machinist halting machining after an extremely short timespan (and unacceptable tool life) due to such deterioration being considered tool failure. However, with a new understanding that the current tool should be considered operationally different from a cemented carbide face mill, the initially positive axial rake angle α was incorporated with the expectation that rapid wear would indeed occur yet such wear would merely reduce the edge to a negative axial rake angle geometry. Accordingly, by providing an initially positive axial rake angle tool, life was comparatively increased over a comparative face mill designed with what had previously been considered to be a more advantageous negative rake angle geometry. It will be understood that in the present application (for example in the first aspect stated above), when it is stated that an axial sub-edge has a positive axial rake angle α, this refers to a face mill prior to first use. By face milling Inconel at the aforementioned cutting speed 300-600 m/min (or at a greater speed if a work station is capable thereof) for a sufficient length of time, a positive axial rake angle α present prior to first use, is transformed by wear to a negative radial rake angle.

It will be understood that while rapid failure of ceramic tools and their prohibitive cost is seemingly the reason such tools are rarely marketed, by utilizing the knowledge that the edge is brittle and will wear quickly, a surprising way has been found to extend the tool life thereof, namely by using positive rake angles and by altering failure criterion from that known for cemented carbide tools. Specifically, instead of monitoring the ceramic face mill for wear, the workpiece itself is monitored for when the finish of the area being machined becomes unacceptable.

It will be understood that while less used, a corner sub-edge is also used for facing applications and therefore there is an additional benefit that such edge, at least adjacent to the axial sub-edge, should also have a positive corner rake angle β.

Conversely, a radial sub-edge is less utilized, and may even be more advantageous if incorporated with a negative radial rake angle λ for even wear with the more heavily used axial and corner edges, or at least reduced wear in comparison thereto.

In view of the above explanations, in accordance with a second aspect of the subject matter of the present application, there is provided a ceramic face mill for machining an Inconel work piece, the face mill configured for rotating about a central rotation axis $A_R$ defining opposite axially forward and rearward directions $D_F$, $D_R$, and opposite rotational cutting and succeeding directions $D_P$, $D_S$, the face mill comprising: a shank portion; and a cutting portion extending forward from the shank portion to a cutting end face; the cutting portion comprising: an effective cutting length $L_E$; a diameter $D_E$ located at the cutting end face; a plurality of teeth; and a gash located between each pair of adjacent teeth of the plurality of teeth; a tooth of the plurality of teeth comprising: a rake surface; a relief surface; and a cutting edge formed at an intersection of the rake and relief surfaces; the cutting edge comprising: an axial sub-edge located at the cutting end face; a radial sub-edge located along a periphery of the cutting portion; and a corner sub-edge extending from the axial sub-edge to the radial sub-edge and defining a corner radius $R_C$; wherein the entire face mill: is made of a ceramic material; and has a unitary monolithic construction; and wherein the entire axial sub-edge has a positive axial rake angle α.

In accordance with a third aspect of the subject matter of the present application, there is provided a ceramic face mill comprising a shank portion and a cutting portion; at least the cutting portion being made of a ceramic material and comprising at least one tooth a curved rake surface.

Despite the comparative difficulty and expense of machining curved surfaces made of ceramic material, a curved rake surface is believed, in theory, to be advantageous over the typical planar rake surfaces used for difficult to machine materials such as ceramic and superhard materials such as PCD and PCBN.

In accordance with a fourth aspect of the subject matter of the present application, there is provided a ceramic face mill comprising a shank portion and a cutting portion; at least the cutting portion being made of a ceramic material and comprising a plurality of teeth and a gash located between each pair of adjacent teeth of the plurality of teeth; each gash between each pair of adjacent teeth is the only gash between said pair of teeth.

Specifically, the gash can be a blended gash.

In view of the comparative difficulty and expense of machining surfaces made of ceramic material, it has been found that a cutting portion is feasible with only a single gash between each pair of teeth. In cemented carbide face mills there are often two gashes, or at least one gash which is typically followed with a flute. To elaborate, where it is stated that there is a single gash or where it is stated that a claimed gash is the only gash between a pair of teeth, it means that the pair of teeth are devoid of a second gash or flute associate therewith. Contrary to the third aspect above, where additional machining of the ceramic face mill was carried out to form a believed advantageous geometry, here additional machining steps (i.e. forming a second gash or flute) have been avoided, so that the production steps can be minimized. Stated differently, in view of the unique function of the ceramic cutting portion it was found that a single gash can be sufficient to produce acceptable machining performance.

Due to the brittle nature of the ceramic, the end mill is configured as a face mill which has a comparatively limited effective cutting length. Even though a longer cutting length would have been advantageous for material removal, this is thus far believed to be yet another limitation of a ceramic cutting portion. Accordingly, the face mill can be devoid of a flute or second gash which is believed advantageous specifically for a ceramic cutting portion.

Such construction provides an unusual appearance in an end view of a cutting end face, the entire cutting edge of a tooth is curved.

In accordance with a fifth aspect of the subject matter of the present application, there is provided a ceramic face mill comprising a shank portion and a cutting portion; at least the cutting portion being made of a ceramic material and comprising a plurality of teeth, each of the teeth being positioned front-of-center.

While it has been known to produce face mills with teeth positioned front-of-center for assisting ejection of chips, it is noted that ceramic face mills are capable of higher temperature operation and hence ejection is less important for the purpose of reducing heat transfer. It is further noted that such positioning leaves material at the center of the face mill and therefore requires an extra grinding operation for the removal thereof. Nonetheless it was theorized that improved ejection is still preferred over the cost of an extra manufacturing step for a comparatively expensive ceramic face mill.

In accordance with a sixth aspect of the subject matter of the present application, there is provided a method of machining an Inconel work piece, comprising: providing the ceramic face mill according to any one of the previous aspects, and face milling the Inconel work piece at a speed greater than 300 m/min and for a length of time sufficient to transform the initially positive axial rake angle, by wear, to a negative axial rake angle.

In accordance with a seventh aspect of the subject matter of the present application, there is provided a method of machining an Inconel work piece, comprising: a ceramic face mill comprising a cutting portion having a cutting end face and a plurality of teeth, each tooth having a cutting edge, each cutting edge comprising: an axial sub-edge located at the cutting end face and having an initially positive axial rake angle α prior to first use, a radial sub-edge having an initially negative radial rake angle λ, and a corner sub-edge having an initially positive corner rake angle β adjacent to the axial-sub edge; and face milling the Inconel work piece at a speed of greater than 300 m/min and for a length of time sufficient to transform the initially positive axial rake angle, by wear, to a negative axial rake angle.

It will be understood that the speeds mentioned in the aspects above have an upper limit defined by the workstation used (typically between 600-800 m/min), and that the highest speed available is preferred. For example, the speed mentioned in the aspects above can preferably be 600 m/min or greater.

It will also be understood that the above-said is a summary, and that any of the aspects above may further comprise any of the features described hereinbelow. Specifically, the following features, either alone or in combination, may be applicable to any of the above aspects:

A. A face mill can have a unitary monolithic construction.
B. A face mill can be configured for rotating about a central rotation axis $A_R$ defining opposite axially forward and rearward directions $D_F$, $D_R$, and opposite rotational cutting and succeeding directions $D_P$, $D_S$.
C. A face mill can comprise a shank portion and a cutting portion extending forward from the shank portion to a cutting end face. The shank portion can be integrally formed with the cutting portion. Despite the fact that ceramic is a relatively brittle expensive material and therefore it is theoretically advantageous to make the shank from an alternative material such as cemented carbide, in practice an integral ceramic shank portion, brittle as it may be, has been found to be more reliable for chucking and is thus preferred.
D. A cutting portion of a face mill is made of a ceramic material. An entire face mill can be made of a ceramic material. The ceramic material can be a SiAlON composite. For example it can be the ceramic material marketed by TAEGUTEC® under the trade name TC3030.
E. A cutting portion can comprise an effective cutting length $L_E$, a diameter $D_E$ located at the cutting end face and a plurality of teeth.
F. A cutting portion can be devoid of a coolant channel. While the use of air (i.e. gas) or fluid may be useful in chip evacuation, there can also be a preferred benefit to simplified production for a ceramic tool due to the comparatively high cost thereof.
G. One or each tooth of a plurality of teeth of a cutting portion can comprise a rake surface, a relief surface, and a cutting edge formed at an intersection of the rake and relief surfaces.
H. At least one or preferably each tooth of a cutting portion can be positioned front-of-center.
I. Each tooth can be identical. Stated differently, a cutting portion can be rotationally symmetric. More precisely, the ceramic face mill can be rotationally symmetric by 360° divided by the number of teeth. Despite such symmetry lacking an anti-vibration characteristic found in many tools, there can also be a preferred benefit to simplified production for a ceramic tool due to the comparatively high cost thereof.
J. A plurality of teeth is preferably equal to or greater than five teeth. For machining ceramic, a high number of teeth reduces heat transfer (by dividing it between teeth) and hence at least five teeth are preferred. However, increasing the number of teeth reduces available flute space. According the plurality of teeth is preferably equal to or less than 11 teeth. Most preferably the plurality of teeth is equal to 5, 7 or 9 teeth, with 7 teeth being considered the most preferred number of teeth taking into account flute space. Preferably the plurality of teeth is an odd number of teeth for reducing vibration.
K. At least one or each rake surface can be a curved rake surface.
L. A cutting edge can comprise an axial sub-edge located at the cutting end face, a radial sub-edge located along a periphery of the cutting portion and a corner sub-edge extending from the axial sub-edge to the radial sub-edge and defining a corner radius $R_C$.
M. At least one, preferably each, entire cutting edge is curved in an end view of the cutting end face.
N. An axial sub-edge can have a positive axial rake angle α (i.e., prior to first use). A maximum axial rake angle α1 of the axial sub-edge can have a value which fulfills the condition: $1° \leq α1 \leq 5°$. Without being bound to theory, it is believed that an initially positive axial rake angle of too large a value may incur fracture too quickly to have any benefit to tool life.

O. At least a portion of a corner sub-edge can have a positive corner rake angle β. The portion under discussion is a portion of the corner sub-edge adjacent to the axial sub-edge and not distal therefrom. The entire corner sub-edge can have a positive corner rake angle β. A minimum positive corner rake angle β1 of the corner sub-edge and a maximum axial rake angle α1 of an adjacent axial sub-edge can fulfill the condition: β1<α1. A corner rake angle β can gradually reduce with increasing proximity to a radial sub-edge.
P. At least a portion of a radial sub-edge, adjacent to the corner sub-edge, can have a positive radial rake angle λ.
Q. A gash can be located between each pair of adjacent teeth of a plurality of teeth of a cutting portion. Stated differently, there can be a gash formed between each pair of adjacent teeth. Each gash between each pair of adjacent teeth can be the only gash between said pair of teeth. The gash can be a blended gash. A cutting portion, can be devoid of a flute or second gash between a pair of teeth. Each gash can extend rearwardly to a gash end, the gash end exiting to a peripheral surface of the cutting portion.
R. An axial length $L_A$ of at least one gash can be measurable from a cutting end face to a gash end of the at least one gash. The axial length $L_A$ can fulfill the condition: $L_A<D_E$, preferably $L_A<2R_C$. The at least one gash can be each gash of a cutting portion. Stated differently each gash can be shorter than the condition $L_A<D_E$, preferably $L_A<2R_C$.
S. A shank portion can have a shank portion length. The shank portion length can be greater than an overall cutting portion length. The cutting portion length can extend to the end of a neck portion of the face mill. Preferably the shank portion length can be greater than twice, even more preferably three times, the overall cutting portion length.
T. A shank portion can have a basic cylindrical shape.

BRIEF DESCRIPTION OF THE DRAWINGS

For a better understanding of the subject matter of the present application, and to show how the same may be carried out in practice, reference will now be made to the accompanying drawings, in which:

FIG. 3 is an enlarged side view of a cutting portion of the face mill in FIGS. 1 and 2;

FIG. 4 is an end view of a cutting end face of the cutting portion in FIG. 3;

FIG. 5 is a cross-section view taken along line V in FIG. 3;

FIG. 6 is a cross-section view taken along line VI in FIG. 3; and

FIG. 7 is a cross-section view taken along line VII in FIG. 4.

DETAILED DESCRIPTION

Figure 1:
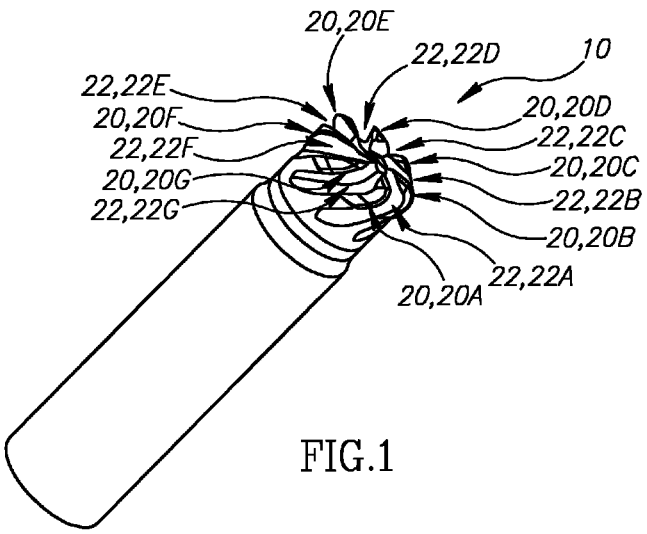
FIG. 1 is a perspective view of an example face mill according to the subject matter of the present application.
Figure 2:
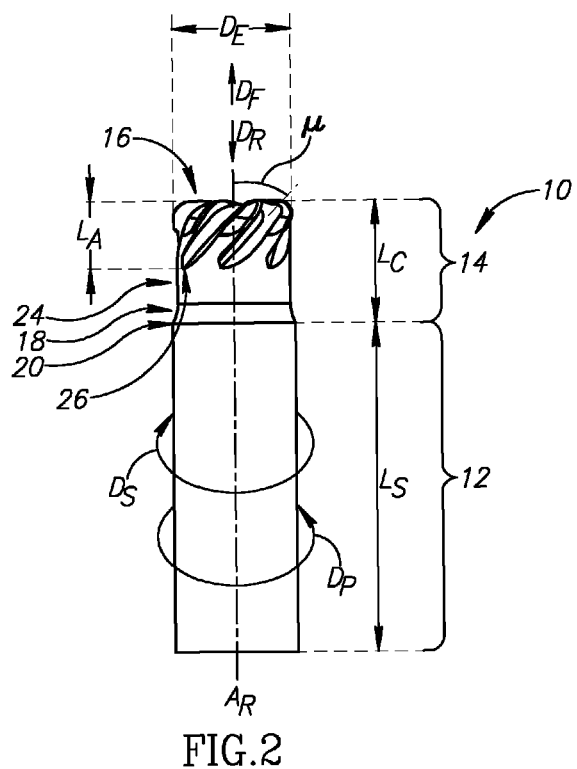
FIG. 2 is a side view of the face mill in FIG. 1.

FIGS. 1 and 2 illustrate a face mill 10 configured for rotating about a central rotation axis $A_R$ which extends longitudinally through the center thereof.

The central rotation axis $A_R$ defines opposite axially forward and rearward directions $D_F$, $D_R$, and opposite rotational preceding and succeeding directions $D_P$, $D_S$, the preceding direction $D_P$ being the cutting direction.

The face mill 10 comprises a shank portion 12 and a cutting portion 14 extending forward (i.e., in the forward direction $D_F$) therefrom.

The shank portion can have a shank portion length $L_S$.

The shank portion 12 can have a basic cylindrical shape. The entire shank portion 12 can be cylindrical (i.e. without grooves or recesses).

The cutting portion 14 extends in the rearward direction $D_R$ from a cutting end face 16 to a neck portion 18. More precisely, the cutting portion 14 can be considered to extend to a neck intersection 20 with the shank portion 12, the neck intersection 20 being defined as the axial location where the neck portion 18 starts to reduce in diameter in the forward direction $D_F$ from the shank portion 12.

It will be understood that the neck portion 14 is optional and that cutting portion 14 should be considered the portion of the face mill 10 which extends forward of the shank portion 12, the shank portion 12 being identifiable as the portion which is configured to be gripped by a collet or chuck, as is known in the art per see.

The cutting portion 14 can have an overall cutting portion length $L_C$. The cutting portion length $L_C$ in this example extends from the cutting end face 16 to the end of a neck portion 18, or more precisely to the neck intersection 20 thereof.

The cutting portion 14 is made of a ceramic material. Specifically, it can be made of a SiAlON composite. More specifically it can be the SiAlON composite marketed under the trade name TC3030.

The cutting portion 14 and the shank portion 12 are, preferably, integrally formed, or stated differently the entire face mill 10 has a unitary monolithic construction. Accordingly, the entire face mill 10 in this example, including the shank portion 12, is made of the same ceramic material.

The cutting portion 14 is integrally formed with a plurality of teeth 20. For example, the plurality of teeth 20 can comprise first, second, third, fourth, fifth, sixth and seventh teeth 20A, 20B, 20C, 20D, 20E, 20F, 20G. As shown from their unbroken appearance, the teeth 20 are non-serrated.

A diameter $D_E$ of the face mill 10 is shown at the cutting end face 16. It will be understood that the diameter $D_E$ at the cutting end face 16 is the widest point between the teeth 20 which is, more precisely stated, slightly rearward of the forward most edge of the face mill 10, yet which is known to constitute the diameter $D_E$ as measured in the art per see.

The plurality of teeth 20 are alternated with a plurality of gashes 22. For example, the plurality of gashes 22 are formed as blended gashes and can comprise first, second, third, fourth, fifth, sixth and seventh gashes 22A, 22B, 22C, 22D, 22E, 22F, 22G.

Referring to FIG. 2, each gash 22 differs from a helical flute in that it does not need to extend helically. It can be a straight gash (i.e. it can extend along an axis), and can extend at a gash angle μ formed with the central rotation axis $A_R$. The gash angle μ can preferably be 42°±5°, such slanted angle assisting with production of the teeth while not requiring a further flute manufacturing step.

While it is indeed feasible to continue the gash in a rearward direction (i.e. generally towards the shank portion 12) in a straight or helical path, it is preferred to minimize the length of the gashes 22 due to the relatively high cost of grinding ceramic.

Each gash 22 becomes more shallow until it reaches a peripheral surface 24 of the cutting portion 14 at a gash end 26. An axial length $L_A$ is measurable from the cutting end face 16 to the gash end 26.

Each tooth 20 in the present example is identical, and equally circumferentially spaced, accordingly the following description of each element is applicable to each of the teeth 20, and characters or arrows directed to different teeth for different elements is merely due to those elements being better shown on a particular tooth in a given view.

Drawing attention also to FIG. 3, each tooth 20 can comprise a rake surface 28, a relief surface 30, and a cutting edge 32 formed at an intersection of the rake and relief surfaces 28, 30.

While in the two-dimensional line-drawings provided, it is difficult to see the curvature of the rake surfaces 28, it will be understood that the rake surfaces are indeed curved or, stated differently, concavely-shaped. Indeed, while the rake surface 28 of the fifth tooth 20E (i.e. at the left side of FIG. 3) appears planar and parallel with the central rotation axis $A_R$, it is understood from viewing the other teeth 20, in particular the sixth tooth 20F, that the teeth 20 are not parallel with the central rotation axis $A_R$ but are forwardly slanted and the rake surfaces thereof are curved.

For the purposes of explanation, the rake surface 28 of the fifth tooth 20E in the view shown in FIG. 3 should be considered to be shown in a profile view.

The cutting edge 32 comprises an axial sub-edge 32A located at the cutting end face 16, a radial sub-edge 32B located along a periphery of the cutting portion 14 and a corner sub-edge 32C extending from the axial sub-edge 32A to the radial sub-edge 32B and defining a corner radius $R_C$.

The corner sub-edge 32C provides a circular arc profile, which during rotation is used to define an imaginary circle $I_C$.

The imaginary circle $I_C$ defines a circle center point $C_P$, axial and radial tangent lines $L_{AT}$, $L_{RT}$, axial and radial tangent points $P_{AT}$, $P_{RT}$ and a radius magnitude corresponding to the corner radius $R_C$.

The axial tangent line $L_{AT}$ extends forwardly from the circle center point $C_P$ and in a direction parallel with the central rotation axis $A_R$.

The axial tangent point $P_{AT}$ is located at an intersection of the circle $I_C$ and the axial tangent line $L_{AT}$.

The radial tangent line $L_{RT}$ extends from the circle center point $C_P$ in a radially outward direction which is perpendicular with the central rotation axis $A_R$.

The radial tangent point $P_{RT}$ is located at an intersection of the circle $I_C$ and the radial tangent line $L_{RT}$.

As shown in FIG. 2, the axial length $L_A$ is smaller than the diameter $D_E$.

By contrast, in FIG. 3, it is shown that the axial length $L_A$ is larger than an effective cutting length $L_E$. The effective cutting length $L_E$ can be measurable from the cutting end face 16 to a point 36 which is a rearmost portion of the cutting edge 32.

The effective cutting length $L_E$ is larger than a recommended machining depth $L_D$. The recommended machining depth $L_D$ of the face mill 10 can be measurable from the cutting end face 16 to a point 38 along the corner sub-edge 32C (i.e. closer to the cutting end face 16 than the radial tangent point $P_{RT}$. It will be understood that machining with a portion of the cutting edge 32 located at the radial tangent point $P_{RT}$, or further from the cutting end face 16 than the radial tangent point $P_{RT}$, will produce radial forces, which are comparatively detrimental for a relatively brittle ceramic face mill 10 operating at extremely high speeds and is thus preferably avoided.

Referring to FIG. 4, the teeth 20 are each positioned front-of-center as shown. To elaborate what is meant by front-of-center, a first radial line $L_{R1}$ can be drawn from the central rotation axis $A_R$ to intersect a start point 34 of an axial sub-edge 32A, in this example of the fourth tooth 20D. Since every point of the entire cutting edge 32 is located behind the radial line $L_{R1}$ (i.e. in the succeeding direction $D_S$), when the material being machined (not shown) contacts any portion of the cutting edge 32, there is always some force component in an outward radial direction $D_O$ assisting to eject the material being machined (or chip outwardly, i.e. away from the face mill 10.

Additionally, since the entire cutting edge 32 is formed with a single gash, and is entirely curved in the end view shown in FIG. 4, a more smooth cutting operation is believed to be achieved.

As shown in FIG. 3, a random cross section has been selected which extends through the radial sub-edge 32B, and in FIG. 5 is used to exemplify what is meant by a negative radial rake angle λ. To elaborate, the cross section is perpendicular to the central rotation axis $A_R$.

The radial rake angle λ is measurable between a second radial line $L_{R2}$ extending radially from the central rotation axis $A_R$ to intersect the radial sub-edge 32B of the first tooth 20A, and a first tangent line $L_{T1}$ extending tangentially from the associated rake surface 28, or more precisely an intersection of the associated rake surface 28 and the radial sub-edge 32B. The radial rake angle λ formed can be understood to be a negative angle if the first tangent line $L_{T1}$ extends behind second radial line $L_{R2}$ in an outward direction (i.e. with increasing distance from the central rotation axis $A_R$). Stated differently, a negative radial rake angle is formed when the first tangent line $L_{T1}$ is located further in the succeeding direction $D_S$ than the second radial line $L_{R2}$.

As shown on the right side of FIG. 3, a random cross section (in this example, along a bisector line $L_B$ which is at a 45° angle with the central rotation axis $A_R$ in this non-limiting example) has been selected which extends through the corner sub-edge 32C of the first tooth 20A, and in FIG. 6 is used to exemplify what is meant by a positive corner rake angle β.

The corner rake angle β is measurable between the bisector line $L_B$ extending from the central rotation axis $A_R$ to intersect the corner sub-edge 32C and a second tangent line $L_{T2}$ extending tangentially from the associated rake surface 28, or more precisely an intersection of the associated rake surface 28 and the corner sub-edge 32C. The corner rake angle β formed can be understood to be a positive angle if the second tangent line $L_{T2}$ extends forward of the bisector line $L_B$. Stated differently, a positive angle is formed when the second tangent line $L_{T2}$ (in an outward direction) is located further in the preceding direction $D_P$ than the bisector line $L_B$.

As shown on the right side of FIG. 4, a random cross section has been selected which extends through the axial sub-edge 32C of the first tooth 20A, and in FIG. 7 is used to exemplify what is meant by a positive axial rake angle α. To elaborate, the cross section is in a plane parallel to the central rotation axis $A_R$.

The axial rake angle α is measurable between an axial line $L_X$ extending parallel to the central rotation axis $A_R$ and a third tangent line $L_{T3}$ extending tangentially from the associated rake surface 28, or more precisely an intersection of the associated rake surface 28 and the axial sub-edge 32C. The axial rake angle α formed can be understood to be a positive angle if the third tangent line $L_{T3}$ extends forward of the axial line $L_X$. Stated differently, a positive angle is formed when the third tangent line $L_{T3}$ (in an outward direction) is located further in the preceding direction $D_P$ than the axial line $L_X$.

What is claimed is:

1. A ceramic face mill for machining an Inconel work piece, the face mill configured for rotating about a central rotation axis $A_R$ defining opposite axially forward and rearward directions $D_F$, $D_R$, and opposite rotational cutting and succeeding directions $D_P$, $D_S$, the face mill comprising:
  a shank portion; and
  a cutting portion extending forward from the shank portion to a cutting end face;
the cutting portion comprising:
  an effective cutting length $L_E$;
  a diameter $D_E$ located at the cutting end face;
  a plurality of teeth; and
  a gash located between each pair of adjacent teeth of the plurality of teeth;
a tooth of the plurality of teeth comprising:
  a rake surface;
  a relief surface; and
  a cutting edge formed at an intersection of the rake and relief surfaces;
the cutting edge comprising:
  an axial sub-edge located at the cutting end face;
  a radial sub-edge located along a periphery of the cutting portion; and
  a corner sub-edge extending from the axial sub-edge to the radial sub-edge and defining a corner radius $R_C$;
wherein the entire face mill:
  is made of a ceramic material; and
  has a unitary monolithic construction; and
wherein the entire axial sub-edge has a positive axial rake angle $\alpha$.

2. The ceramic face mill according to claim 1, wherein a maximum axial rake angle $\alpha 1$ of the axial sub-edge has a value which fulfills the condition: $1° \leq \alpha 1 \leq 5°$.

3. The ceramic face mill according to claim 1, wherein at least a portion of the corner sub-edge, adjacent to the one axial sub-edge, has a positive corner rake angle $\beta$.

4. The ceramic face mill according to claim 3, wherein the entire corner sub-edge has a positive corner rake angle $\beta$.

5. The ceramic face mill according to claim 3, wherein a minimum positive corner rake angle $\beta 1$ of the corner sub-edge and a maximum axial rake angle $\alpha 1$ of the axial sub-edge fulfill the condition: $\beta 1 < \alpha 1$.

6. The ceramic face mill according to claim 3, wherein the corner rake angle $\beta$ gradually reduces with increasing proximity to the radial sub-edge.

7. The ceramic face mill according to claim 1, wherein each gash between each pair of adjacent teeth is the only gash between said pair of teeth.

8. The ceramic face mill according to claim 1, wherein each gash between each pair of adjacent teeth extends rearwardly to a gash end, the gash end exiting to a peripheral surface of the cutting portion.

9. The ceramic face mill according to claim 8, wherein an axial length $L_A$ of at least one of said gashes can be measurable from the cutting end face to the gash end thereof, the axial length $L_A$ fulfilling the condition: $L_A < D_E$.

10. The ceramic face mill according to claim 9, wherein the axial length $L_A$ fulfills the condition: $L_A < 2R_C$.

11. The ceramic face mill according to claim 1, wherein the plurality of teeth is equal to or greater than five teeth.

12. The ceramic face mill according to claim 11, wherein the plurality of teeth is equal to or less than 11 teeth.

13. The ceramic face mill according to claim 12, wherein the plurality of teeth is equal to 5, 7 or 9 teeth.

14. The ceramic face mill according to claim 1, wherein at least one tooth of the plurality of teeth is positioned front-of-center.

15. The ceramic face mill according to claim 1, further being devoid of a coolant channel.

16. The ceramic face mill according to claim 1, wherein, in an end view of the cutting end face, the ceramic face mill is rotationally symmetric by 360° divided by the number of teeth.

17. The ceramic face mill according to claim 1, being made of a SiAlON composite.

18. The ceramic face mill according to claim 1, wherein at least one rake surface is curved.

19. The ceramic face mill according to claim 1, wherein at least one entire cutting edge is curved in an end view of the cutting end face.

20. A method of machining an Inconel work piece, comprising:
  providing the ceramic face mill according to claim 1, and
  face milling the Inconel work piece at a speed greater than 300 m/min and for a length of time sufficient to transform the initially positive axial rake angle, by wear, to a negative axial rake angle.

* * * * *